United States Patent

[11] 3,581,747

| | | | | |
|---|---|---|---|---|
| [72] | Inventor | Frank F. Scribner Hoopeston, Ill. | | |
| [21] | Appl. No. | 820,219 | | |
| [22] | Filed | Apr. 29, 1969 | | |
| [45] | Patented | June 1, 1971 | | |
| [73] | Assignee | FMC Corporation San Jose, Calif. | | |

[54] TAPERED ROLL HARVESTER
9 Claims, 15 Drawing Figs.

[52] U.S. Cl...................................................... 130/30, 56/1
[51] Int. Cl....................................................... A01d 45/00
[50] Field of Search............................................ 56/1 C; 130/30; 171/133

[56] References Cited
UNITED STATES PATENTS

| | | | |
|---|---|---|---|
| 1,528,502 | 3/1925 | Murphy........................ | 171/133 |
| 2,370,560 | 2/1945 | Maus............................ | 56/1C |
| 2,685,548 | 8/1954 | Drozdowski................. | 56/1C |
| 2,947,130 | 8/1960 | Everett......................... | 56/1C |
| 2,957,292 | 10/1960 | Griffiths....................... | 56/1C |
| 3,043,073 | 7/1962 | Bornzin........................ | 56/1C |
| 3,387,612 | 6/1968 | Tillotson...................... | 130/30 |

*Primary Examiner*—Antonio F. Guida
*Attorneys*—F. W. Anderson and C. E. Tripp

ABSTRACT: The snapping rolls of a vine crop harvester for cucumbers are tapered from their outer ends to a midportion of the rolls for counteracting the loss of gripping power due to the deflection of the rolls under load.

FIG_7

TAPERED ROLL HARVESTER

FIELD OF THE INVENTION

This invention relates to harvesters and more particularly to harvesters for vine crops such as cucumbers or the like employing snapping rolls for pulling the vines through while snapping off the cucumbers from the vines.

DESCRIPTION OF PRIOR ART

A cucumber harvester having a set of snapping rolls of the type to which this invention relates appears in the U.S. Pat. to Looker No. 3,387,611, June 11, 1968 (FIG. 4), assigned to the FMC Corporation. If these snapping rolls are made quite long to encompass a wide swath, vine feed and plugging problems occasionally arise.

SUMMARY OF THE INVENTION

A relatively recent development in the harvesting of green vine crops such as cucumbers is once-over harvesting, wherein the green vines are severed at the ground and delivered by a conveyor to snapping rolls. These rolls both pinch off the cucumbers from the vines and grip and pull on the vines, thereby discarding the vines. The cucumbers are collected separately from the vines, as described in the aforesaid Looker patent.

The harvesting of cucumbers from green growing vines has been found to present more difficulties than the harvesting of many vine crops, such as potatoes or the like, in that the amount of pull that must be exerted on the vines to snap off the cucumbers is considerable. This is probably due to the fact that the attachment of growing cucumbers to their vines is relatively strong. Also the vines, being green, exude water under roll pressure, which lubricates the pinch off rolls and causes them to slip unless a powerful grip is maintained on the vines. Once the rolls begin to slip on the vines they become plugged or loaded up with vine masses, and the harvesting operation must be interrupted for clearing the rolls of the plugged masses.

Another problem that requires attention in the machine harvesting of cucumbers is the fact that in many instances the most valuable cucumbers are the small ones which are to be made into pickles, and hence are commonly referred to as "pickles." Consideration will show that assuming a given size small cucumber or "pickle," a pair of large diameter rolls will more readily engulf and grip the pickle then will a corresponding set of small diameter rolls, the latter acting to cam the pickle free of the rolls rather than to engulf and crush it. On the other hand, although the use of relatively small diameter rolls minimizes the tendency to engulf, grip and crush the pickles, these rolls have less rigidity against radial deflection under the loads exerted by the vines passing between the rolls along their length, that is from end to end of the rolls. As a result, the use of long, small diameter rolls under certain demanding harvesting conditions and heavy duty service has resulted in the plugging or slippage of the rolls on the crop, even though an auxiliary pull roll has been provided in accordance with the teachings of the aforesaid U.S. Pat. to Looker, No. 3,387,611; and the U.S Pat. to Tillotson No. 3,387,612, the latter patent also being assigned to the FMC Corporation.

Under the present invention, relatively long pinch off or snapping rolls (e.g. in the order of 7 feet long) can be employed without plugging, even though the diameter of the rolls is in the order of only 3½ inches. Thus, although the ratio of roll length to roll diameter is well over 20, the "pickles" are not engulfed, bruised or crushed by the rolls, but are cammed clear of and snapped free of their vines.

Such a rubber covered roll set can be employed without plugging under the present invention because the rolls are tapered to compensate for the radial deflection of the rolls under the distributed loading exerted on the rolls by the vines as they pass between the rolls. Under the present invention the outer radius of the rolls is gradually increased from a normal radius at the roll ends (e.g. 1.75 inch) to a larger radius at a roll intermediate portion, and the magnitude of the radius increase is substantially equal to the deflection of the metal roll core that would be engendered by uniformly loading the roll core along its length (e.g. 74 inches) in simulation of the actual loading encountered during harvesting. In the preferred embodiment of the invention, the rolls have steel cores and rubber covers and the taper or radius increase referred to above is imparted to the rubber covers of the rolls themselves rather than to their cores. However, it is contemplated that the cores can also be tapered to attain the mode of operation characteristic of the present invention.

Another feature of the invention resides in the fact that special feeder rolls are provided at the snapping rolls for spreading the vine mass into a layer instead of feeding it as bunched up masses to the snapping rolls.

GENERAL DESCRIPTION OF A HARVESTER

Figure 1:
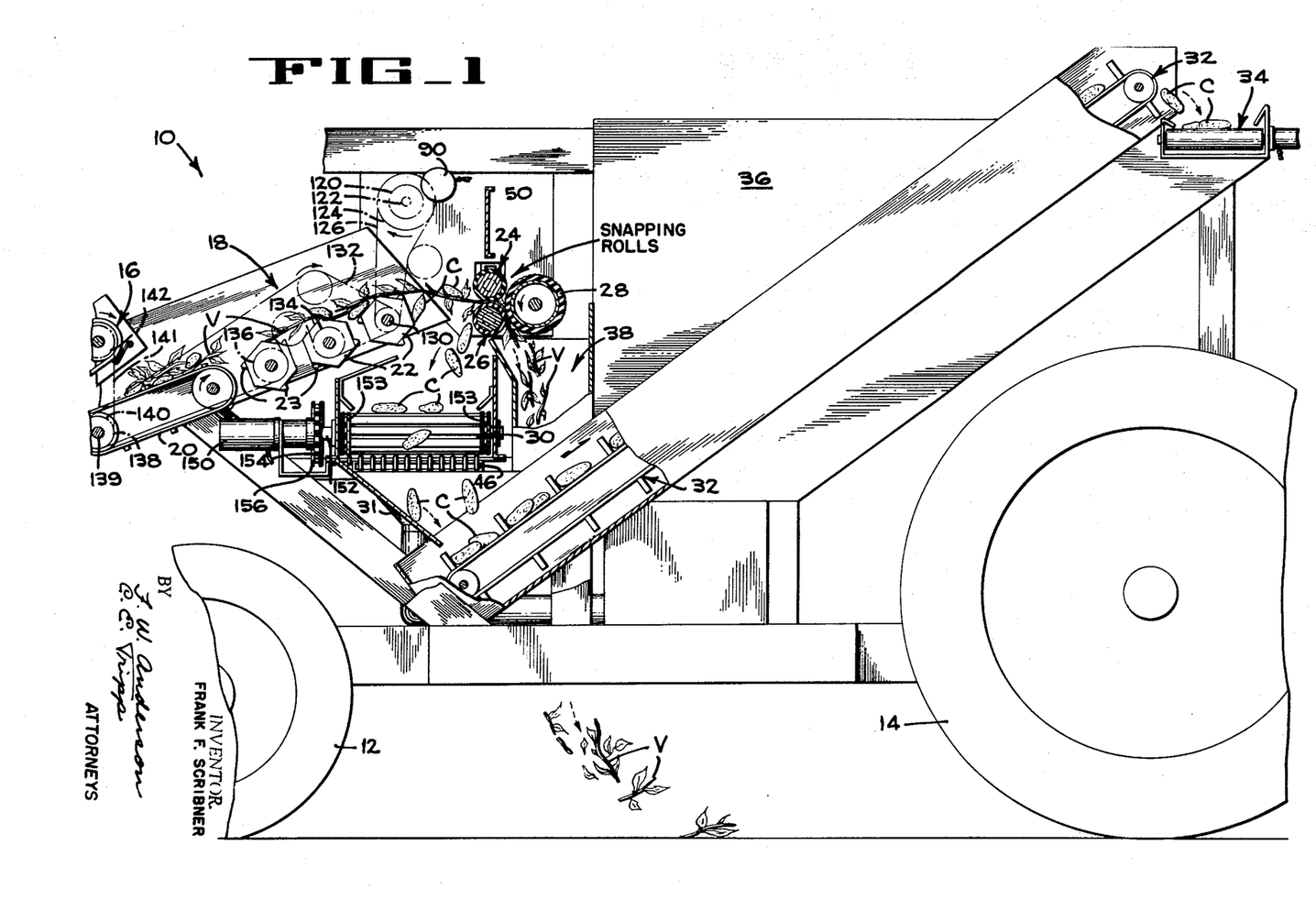
FIG. 1 is a fragmentary side elevation of a harvester embodying the present invention, with parts broken away.
Figure 5:
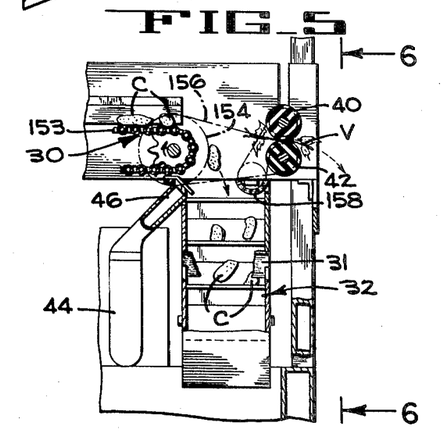
FIG. 5 is a partial section taken on 5-5 of FIG. 2 showing the vine-clearing rollers.
Figure 6:
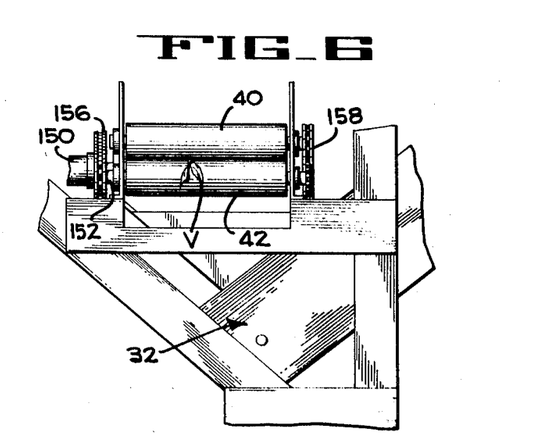
FIG. 6 is a side view of the vine-clearing rollers looking from 6-6 of FIG. 5.
Figure 7:
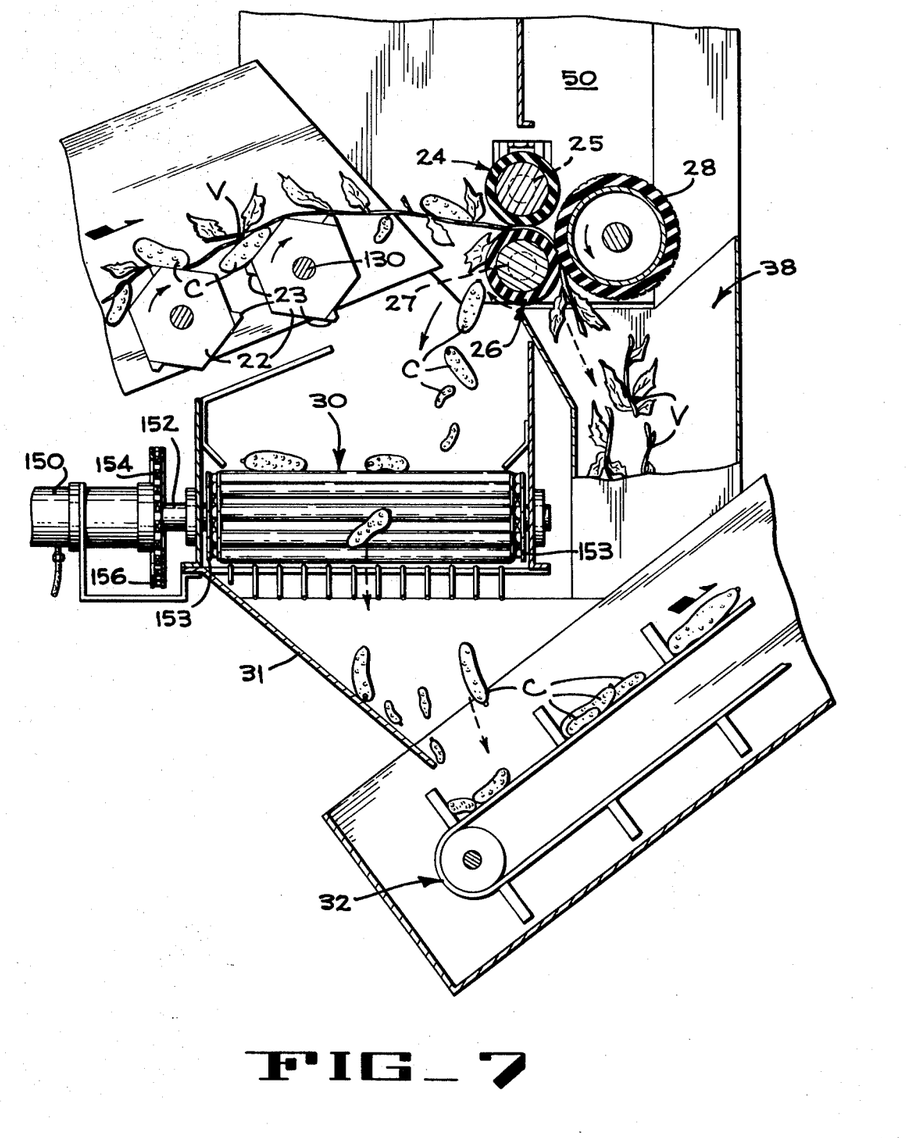
FIG. 7 is an enlarged view of the snapping rolls similar to FIG. 1.

FIG. 1 is a side elevation showing portions of the cucumber harvester essential to the present invention, and FIG. 7 is a similar view on a larger scale showing the cucumber-detaching or snapping action of the snapping rolls. FIGS. 5 and 6 show vine-clearing rollers associated with a cucumber conveyor the vine-clearing rollers having been omitted from FIGS. 1 and 7 for clarity of illustration. A general description of the harvester embodying the invention will now be given in conjunction with the aforesaid FIGS. 1—7.

In the once-over over harvesting process of the present invention the growing cucumber vines are cut off at the ground and the vines with attached cucumbers are conveyed upwardly by feed or delivery conveyors to a set of snapping rolls. The snapping rolls grip the vines and pull them through, whereas the cucumbers are cammed or snapped clear of the rolls, so that the vines are pulled through whereas the cucumbers drop back onto a collector conveyor (see FIG. 7). Major harvesting portions of the machine appear in FIG. 1, wherein the machine is indicated generally at 10 and has front wheels 12 and rear wheels 14, the latter being driven to propel the harvester along several rows of crop. The cucumber vines are severed at the ground by sickle bars, V-knives, rotating discs, or the like, (not shown) and the vines with attached cucumbers are delivered by such severing devices to an elevator or feeder conveyor 16, the delivery end of which appears at the extreme left of FIG. 1. As mentioned, the manner in which the vines are severed for pickup by the feeder conveyor 16 is not essential to the invention and structures suitable for this purpose are found in the U.S. Pats. to Hill No. 3,331,198, July 18, 1967; Button No. 3,390,768, July 2, 1968 and the aforesaid patent to Looker No. 3,387,611, June 11, 1968. As to the snapping roll set, the rolls of the present invention represent an improvement over the rolls of the aforementioned Looker patent, as has been previously indicated.

In the feeding system shown in FIG. 1, vines V and their attached cucumbers C have dropped from the elevator conveyor 16 onto an intermediate delivery and layer forming conveyor indicated generally at 18. The intermediate conveyor 18 in this embodiment includes a short, cleated belt conveyor 20 for receiving the mass of vines and cucumbers from the elevator conveyor 16, and a series of hexagonally contoured feeding rolls 22. The rolls 22 have axial cleats 23, and these rolls act to flatten and distribute the vines and cucumbers into a layer for delivery to the rubber-covered snapping rolls 24,26. A pull-augmenting roll 28 is held in firm engagement with the lower snapping roll 26 so that vines, after continuing through the snapping rolls 24,26, are gripped and pulled by the lower snapping roll 26 and the pull-augmenting roll 28.

The action of the snapping rolls and the pull augmenting roll is also illustrated on a somewhat clear and enlarged scale in FIG. 7 of the drawings. Cucumbers C are detached from their vines and drop onto a laterally running collector conveyor 30 which drops them on the near side of the machine onto a slide plate 31 and hence onto a cucumber elevator conveyor 32. The latter delivers the cucumbers to a hopper conveyor 34 (upper right of FIG. 1) which runs laterally and drops them into a hopper 36 carried on the machine. The details of the handling of the detached cucumbers and of the unloading of the hopper are not essential to the present invention and are not herein described.

The vines V from which the cucumbers have been snapped at the snapping rolls 24,26 are pulled through by the rolls 26,28 into a vine chute 38 and when the vines are released by these rolls, they drop through the chute onto the ground as indicated in FIG. 1.

Figure 2:
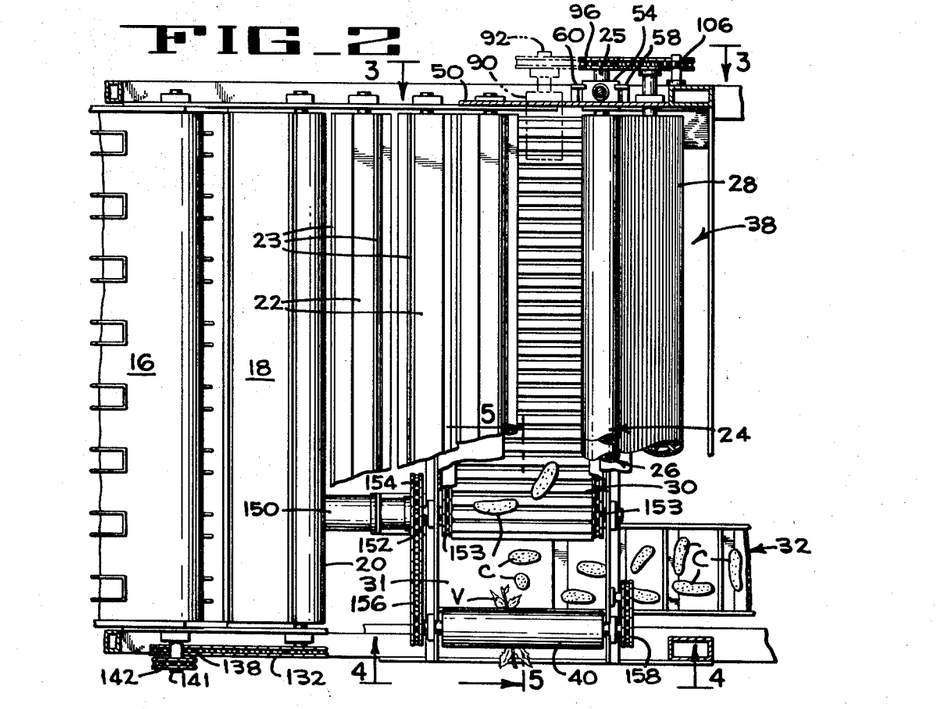
FIG. 2 is a plan of the harvester at the snapping rolls.

The plan view of FIG. 2 shows how the cucumber collector conveyor 30 drops the cucumbers C onto the plate 31, which in turn drops them onto the elevator conveyor 32. This view also shows the relationship of a pair of vine-clearing rollers to the collector conveyor 30, only the upper roller 40 of this pair appearing in FIG. 2.

FIG. 5 shows the upper vine-clearing roller 40 and a lower vine-clearing clearing roller 42 as well as a blower 44 having a vine-sweeping nozzle 46. With this construction, vines on the collector conveyor 30 are swept into the nip of the vine-clearing rollers 40,42 and are hence removed from the machine rather than be carried along with the cucumbers onto the cucumber delivery conveyor 32.

FIG. 6 is a side elevation of the delivery side of the vine-clearing rollers 40,42, as they appear when the machine is viewed as in FIGS. 1 and 7.

ROLL DRIVE

Figure 3:
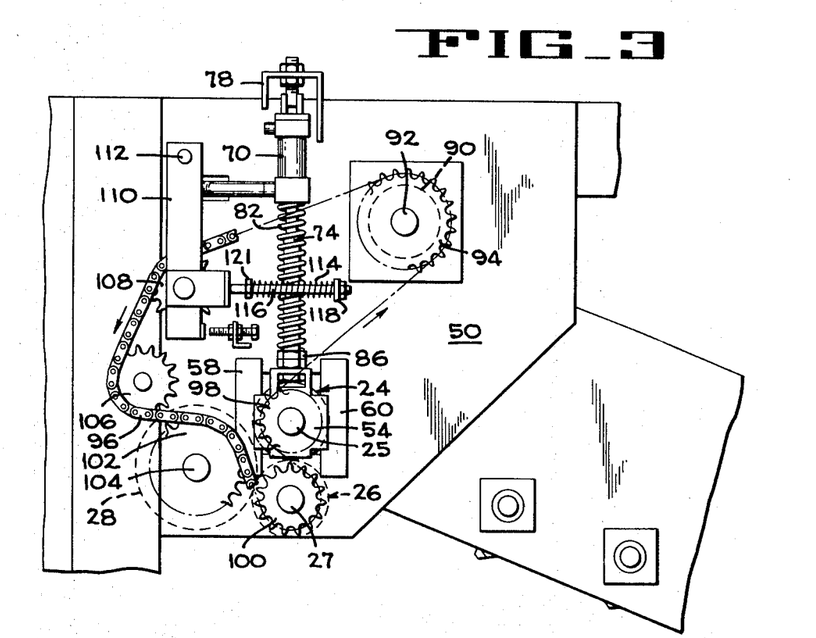
FIG. 3 is a side view of the harvester taken on 3-3 of FIG. 2, showing the snapping roll drive.

FIG. 3 shows how the snapping rolls 24,26 and the pull roll 28 are driven at the far side of the machine as it is viewed in FIGS. 1 and 7, as well as how the upper snapping roll is firmly pressed against the lower snapping roll. The near side mounting of the roll set is shown in FIG. 4.

Referring to FIG. 3, the lower snapping roll 26 has a stub shaft 27 which is rotatably supported in a side plate 50 of the harvester by an antifriction bearing, not shown.

Figure 4:
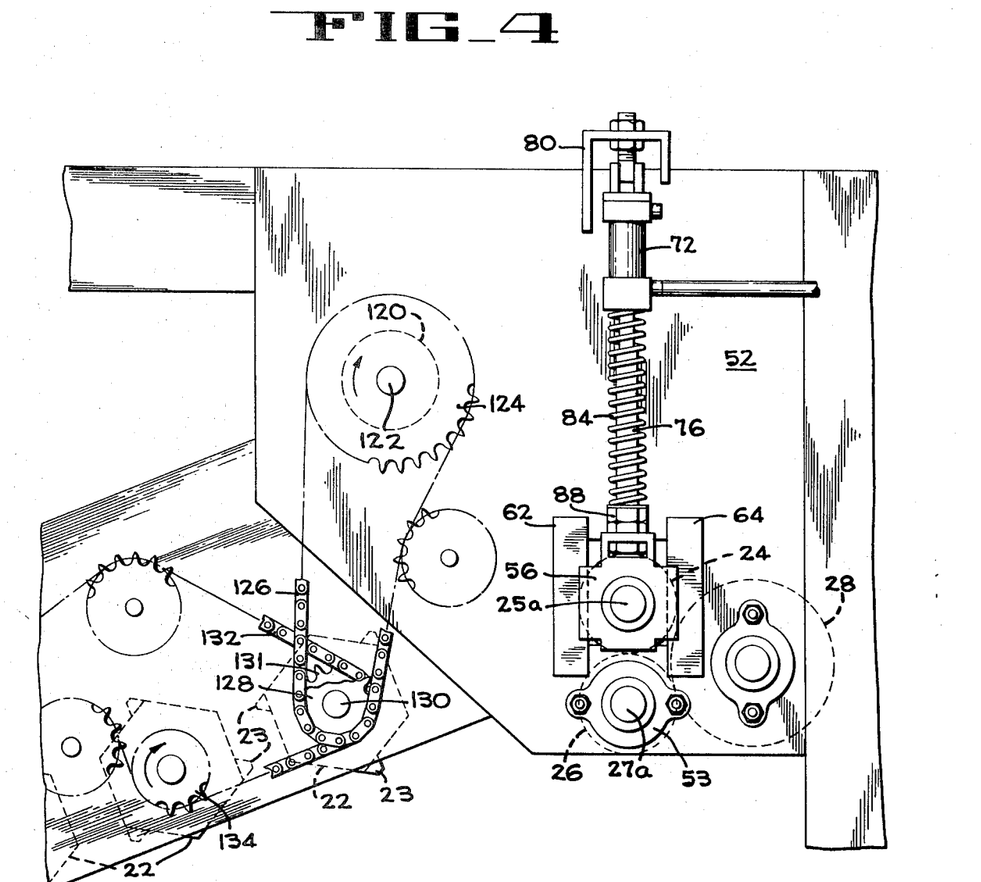
FIG. 4 is a side view looking in the direction of 4-4 of FIG. 2, showing the snapping rolls and feed conveyor drive.

FIG. 4 shows the mounting of the rolls at the near side of the machine in a plate 52, and in this view the other stub shaft for the lower snapping roll 26 is indicated at 27a and an antifriction bearing 53 for this stub shaft also appears.

The upper snapping roll is spring pressed against the lower snapping roll 26 and for this reason the stub shaft 25 of the upper roll (FIG. 3) is mounted in a sliding bearing block 54 and the other stub shaft 25a is mounted in a sliding bearing block 56, FIG. 4. The bearing block 54 slides in ways or guides 58,60 (FIG. 3) and the block 56 for the other end of the upper roll slides in guides 62,64 (FIG. 4).

The upper snapping roll 24 is spring pressed against the lower roll during normal harvesting operations. Also illustrated in FIGS. 3 and 4 is a hydraulic retracting mechanism, which retracts the upper roll from the lower one under certain overload conditions not normally encountered. This retracting mechanism is not essential to operation of the harvester of the present invention but is shown as illustrative of a more complete machine. The retracting mechanism herein indicated in FIGS. 3 and 4 is described in detail in the copending U.S. Pat. application of Looker et al., Ser. No. 793,780, filed Jan. 24, 1969 and assigned to the FMC Corporation. It is to be understood that the configuration of the roll set characteristic of the present invention can be employed without a roll-retracting mechanism and hence, the latter is not described in detail herein.

In the construction shown in FIGS. 3 and 4, roll-retracting cylinders 70 and 72 have pistons with piston rods 74 (FIG. 3) and 76 (FIG. 4), respectively. The cylinders 70,72 are supported firmly on the frame of the machine by mountings 78 (FIG. 3) and 80 (FIG. 4), respectively.

A roll-loading spring 82 (FIG. 3) surrounds the piston rod 74 with the piston serving as a spring guide. Similarly, a spring 84 surrounds the piston rod 76 at the other end of the upper snapping roll 24 (FIG. 4). The lower end of the springs 82,84 bear against nuts 86 (FIG. 3) 88 (FIG. 4) that secure the respective piston rods to the sliding roll-supporting blocks, 54,56 previously mentioned. The upper ends of the springs 82,84 bear against the lower ends of their respective cylinders 70,72. Since the cylinders are firmly anchored to the machine, the springs 82 thus mounted press the upper roller 24 against the lower roller 26 and the springs are initially compressed when the rollers are in engagement to impart a preload to the upper roller. In the example being given, with rollers 24,26 having a nominal diameter of 3½ inches and with those rollers being about 7 feet long (86 inches) each of the springs 82,84 is preloaded to exert a force of 300 pounds on its respective roller stub shaft. The spring rate of these springs as selected in the example being given is 808 lbs./inch of spring deflection.

As mentioned, for the purposes of the present invention it can be considered that the retraction cylinders 70,72 are not operating to lift the upper roller 24 from the lower roller, and hence for all purposes in a normal operation, the upper ends of the springs 82,84 can be considered as being seated on the frame of the machine. As a matter of fact, merely rendering the hydraulic cylinder 70,72 inoperative by disconnecting their fluid lines or failing to connect them to the control mechanism shown in the aforesaid copending application of Looker et al., Ser. No. 793,780 represents what would be the equivalent of eliminating the cylinders and mounting the upper ends of the springs directly on the frame plates 50,52.

Means are provided to drive the three rollers 24,26 and 28 in a direction such that the vines will be pulled through the rollers as previously illustrated and described in connection with FIGS. 1 and 7. In the driving system shown in FIG. 3, a hydraulic motor 90 (also shown in phantom in FIG. 2) is mounted behind the plate 50 and has a shaft 92 for a roll-driving sprocket 94. The sprocket 94 drives a chain 96 which is trained around a sprocket 98 on the stub shaft 25 of the upper roll 24 and a sprocket 100 on the stub shaft 27 of the lower snapping roll 26. The chain 96 is further trained around a sprocket 102 on a stub shaft 104 of the pull roll 28, the pull roll being mounted in the plates 50 (FIG. 3) and 52 (FIG. 4) in the manner in which the lower snapping roll 26 is mounted in those plates. In order to maintain driving engagement between the chains and the roll sprockets 98, 100 and 102, an idler sprocket 106 is provided (FIG. 3) for the chain. In order to maintain driving tension on the chain, a jockey sprocket 108 is mounted on an arm 110 pivoted to the frame plate 50 at 112. A compression spring 114 surrounds a takeup rod 116 that is connected to the arm 110 and one end of the spring is anchored to a rod anchor bracket 118 secured to the plate 50, whereas the other end presses against a nut 121 threaded onto the takeup rod 116.

Inspection of FIG. 3 shows how the drive chain design imparts the direction of rotation to the rollers 24,26 and 28 required to attain the operation of vine pulling and cucumber harvesting illustrated in FIGS. 1 and 7, but it will be noticed in this connection that the roller drive illustrated in FIG. 3 is on the far side of the machine as it is viewed in FIGS. 1 and 7, and hence the position of the parts are reversed from right to left in FIG. 3 as compared to FIGS. 1 and 7.

CONVEYOR DRIVES

FIGS. 1 and 4 also show drives for the feeder conveyors. The conveyor drives are on the same side of the machine from which the views of FIGS. 1 and 7 are taken, and in this embodiment the conveyors are driven by another hydraulic motor 120, having a drive shaft 122 to which is secured a drive sprocket 124. A drive chain 126 connects the sprocket 124 and a conveyor roller sprocket 128 on the stub shaft 130 of the third delivery roller 22 previously described.

In order to drive the other rollers 22, the cleated conveyor 20 (FIG. 1) and the pickup conveyor 16, a sprocket 131 is mounted on the roller shaft 130 (FIG. 4) which is the same size of and just behind the sprocket 128 just described. This companion sprocket 131 to sprocket 128 drives a chain 132 which is trained around sprockets 134 and 136 (FIG. 1) for driving the other rollers 22. The chain 132 is also trained around a sprocket 138 indicated at the extreme left of FIG. 1 on the drive shaft 139 for the belt conveyor 20. Shaft 139 also mounts a sprocket 140 (FIG. 1) which drives a chain 141 (FIG. 2) and a sprocket 142 on the delivery roller shaft of the elevator conveyor 16.

The cucumber collector conveyor 30 is driven by a hydraulic motor 150 (FIGS. 2 and 6) which is on the sprocket shaft 152 for the collector conveyor side chains 153. The collector conveyor drive shaft 152 also mounts a sprocket 154 which drives a chain 156 and the lower vine-clearing clearing roller 42 (FIGS. 2, 5 and 6). The upper vine-clearing roller 40 is driven by a chain and sprocket assembly indicated generally at 158 that is trained around sprockets on the rollers 40,42 and an idler as seen in FIG. 5. The details of this roller drive are mere engineering conventions and are not essential to an understanding of the present invention.

The drives for the cucumber elevator conveyor 32 (FIG. 1) and the transverse hopper conveyor 34 are by means of hydraulic motors connected to one of the conveyor pulleys in accordance with conventional current harvesting art.

OPERATION

The operation of the harvesting structure just described will now be briefly summarized in order that the nature of the present invention can be more clearly understood. In the embodiment illustrated, the snapping rolls 24,26 are quite long so that a number of crop rows can be simultaneously harvested. The relative slenderness (high length to diameter ratio) of the snapping rolls appears in the scale ratio drawing of FIG. 8, as previously described. As the machine precedes down the field, the vine-cutting and pickup elements sever the green growing vines and their attached cucumbers and place a wide swath of vines on the elevator conveyor 16. (FIG. 1). This material is deposited by the elevator conveyor onto the cleated conveyor 20 and is carried over the beater and distributing rolls 22 which spreads it out into a layer. With a full crop, this layer loads the snapping rolls 24,26 along their entire length, in a relative uniform manner, such uniform loading being facilitated by the action of the hexagonal, cleated feed rolls 22. The vines are fed to the snapping rolls as best seen in FIG. 7, which grip the vines and pulls the cucumbers C up toward the nip of the rolls. However, the rolls are of relatively small diameter compared to the size of even the smallest cucumber or pickle, and hence, assuming that the rolls exert a powerful enough pull on the vines, the cucumbers will be snapped off of the vines rather than being caught, crushed or gripped therebetween, all as previously described. The powerful pull in the present invention is engendered not only between the snapping rolls themselves, but with the assistance of the pull roll 28, the result being that in a normal operation the machine operates continuously without plugging and usually without need for the piston release mechanism.

The cucumbers C that are snapped off the vines fall to the collector conveyor 30 and are dropped from the end of that conveyor onto the elevator conveyor 32 and hence on into the hopper as previously described. The vines are pulled from between the pull rolls 28 and the lower snapping rolls 26 and fall into a chute 38 which drops them back onto the ground.

TAPERED ROLL CONSTRUCTION

As previously explained, under the present invention the snapping rolls 24,26 are tapered in order to provide the uniform roll pressure along the full length of the rolls, which minimizes vine slippage and plugging at the midportions of the rolls. The snapping rolls 24,26 are formed with solid steel cores 160,162 respectively, and the steel cores have rubber covers 164,166 bonded thereto, respectively. In the preferred form of the invention illustrated in FIG. 8 and in shortened form in FIG. 11 for exaggerating the taper, the rollers 24 and 26 are identical and hence only the roller 24 is shown in detail in FIG. 11.

Figure 8:
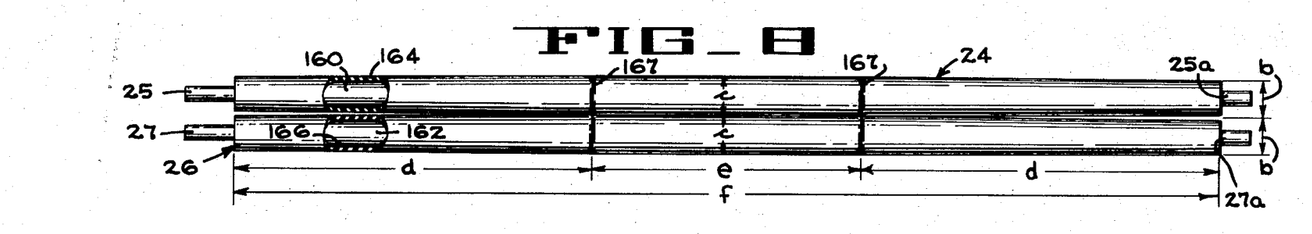
FIG. 8 is a side elevation of a pair of snapping rolls embodying the present invention, wherein the roll length to roll diameter ratio is drawn to scale.
Figure 11:
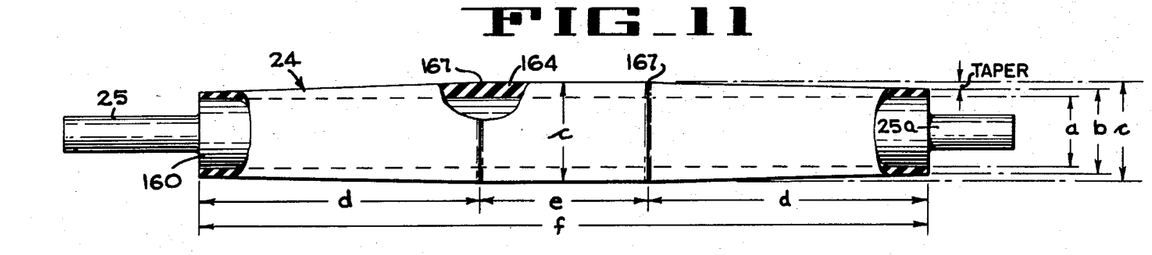
FIG. 11 is a diagram illustrating the preferred embodiment of the invention. In this diagram as well as in the diagrams of FIGS. 12—15 showing modified forms of the invention, the ratio of the length of the rolls to their diameter has been greatly decreased in order to exaggerate the taper of the rolls for illustration.

As can be seen in FIG. 8 and more clearly in FIG. 11, the roll 24 has a gradually increasing diameter from a minimum diameter "$b$" to a maximum diameter "$c$" at a midportion of the roll. The diameters just referred to are the external diameters of the rubber cover 164. In the preferred construction of FIGS. 8 and 11, each of the rollers 24,26 has its diameter increased by gradually increasing the roll radius from each end of the roll toward a midportion of the roll indicated at 167, this taper extending over portions of the roll length from each end of the roll as indicated by the axial dimension "$d$."

The central section of the roll between the transition zones 167 and indicated by the axial dimension "$e$" is of uniform diameter, this diameter equaling the maximum diameter "$c$."

In the preferred form of the invention illustrated in FIGS. 8 and 11, the diameter of the steel core 160 for the roll 24 and 162 for the roll 126 is uniform and has a diameter "$a$" illustrated in FIG. 11. In this form of the invention therefor, all of the taper imparted to the rollers is provided in a rubber cover 164. One convenient method of manufacturing a roller of this design is to bond the rubber cover 164 to the steel core while the cover has its maximum diameter of "$c$" as illustrated in the drawings and thereafter buffing (grinding) the roll down to the minimum diameter (radius) indicated at "$b$" at each end of the roll. This provides a uniform taper along a majority of each roll end which is so designated at the right of FIG. 11.

In the embodiment of the invention shown in FIGS. 8 and 11, the rolls have an overall effective length "$f$" of 86 inches, the tapered portions "$d$" are 31 inches long and the cylindrical midportion "$e$" is 24 inches long. The diameter "$a$" of the steel core 160 (FIG. 11) is 2.75 inches and the major diameter "$c$" of the midportion of the rubber cover 164 is 3.594 inches, whereas the rubber cover diameter "$b$" at each end of the roll is 3.50 inches. This gives a total taper on the radius of 0.047 inches which represents a radius taper over the dimension "$d$"

of 31 inches of 0.018 inches/ft. Hence, the thickness of the rubber cover 164 at each end of the roll is three-eighths of an inch, and at the midportion of the roll, that is at major diameter "$c$" the rubber cover has a thickness of 0.422 inches.

When the rolls thus constructed are loaded by the springs 82 (FIG. 3) and 84 (FIG. 4) at the ends of the upper roll 24, the rubber covers 164 and 166 of the rolls 24,26 respectively deform locally at their contact line, such deformation being sufficient to bring the rolls into full pressure engagement along their lengths, (the rolls are shown in FIG. 8 without spring loading). When the vines with attached cucumbers are presented to these rolls across their lengths the vines provide an evenly distributed load along the rolls, deflecting both of them, and without the roll construction of the present invention vine slippage and plugging occurs under heavy duty conditions at the midportions of the rolls. However, it has been found that even though the load is transmitted to the roll cores through their rubber covers, and that even though the actual steel cores 160,162 are deflecting, these deflection forces transmitted to the roll cores through the rubber covers, resulting in springing of the relatively long, small diameter rolls, is effectively compensated for by the tapered or increased radius construction just described. Thus, a machine having a snapping roll set design in accordance with the preferred embodiment of the invention will operate continuously throughout severe harvesting conditions without plugging and without requiring stopping of the machine for clearing of the snapping roll set.

ROLL DESIGN BASIS

Figure 9:
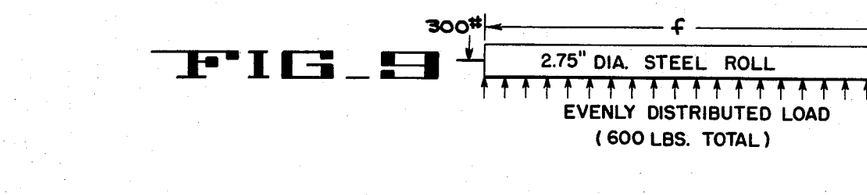
FIG. 9 is a diagram showing the manner in which the roll configuration of the present invention was determined.
Figure 10:
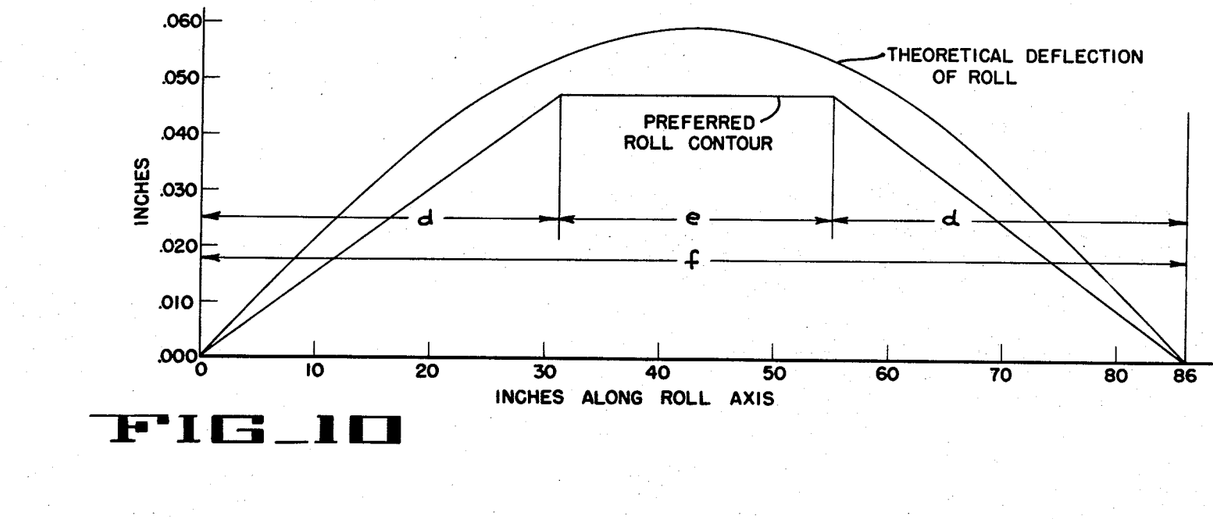
FIG. 10 shows two curves indicating the evolution of the design of rolls of the present invention.

The manner in which the roll design just described was computed and determined is illustrated diagrammatically in FIGS. 9 and 10. First, referring to FIG. 9, in order to determine the amount of taper or radius increase imparted to the rolls it was assumed that a 2.75 inch diameter steel roll had imparted thereto a 300-pound load at each end thereof and that an evenly distributed load of 600 pounds total was applied along the length of the roll. Under these conditions, the theoretical deflection of the roll was calculated and plotted in terms of inches along the roller axis on the abscissa and roll deflection in inches on the ordinate of a curve. This theoretical deflection curve of the roll is parabolic, as can be seen in FIG. 10 with a maximum deflection at the midplane of the roll in the order of 0.60 inch. It was decided to determine whether the preferred roller contour also illustrated in the curves of FIG. 10 would perform satisfactorily, even though it represented only an approximation of the theoretical deflection curve of the assumed 2.75 inch diameter steel roll as just described. This preferred roller contour was designed to compensate for an assumed maximum steel core deflection of 0.47 inches and hence provides the roll dimensions just described in connection with FIGS. 8 and 11. As previously explained the actual roll contour, in a preferred embodiment was provided by bonding the rubber covers to the rolls and buffing off the rubber at the end portions "$d$" as uniform tapers. Thus, even though the preferred roll contour does not correspond to the theoretical deflection curve of the roll, and even though the contour is imparted to a rubber roll cover, instead of a steel roll, highly satisfactory results were attained.

MODIFICATIONS

Figure 12:
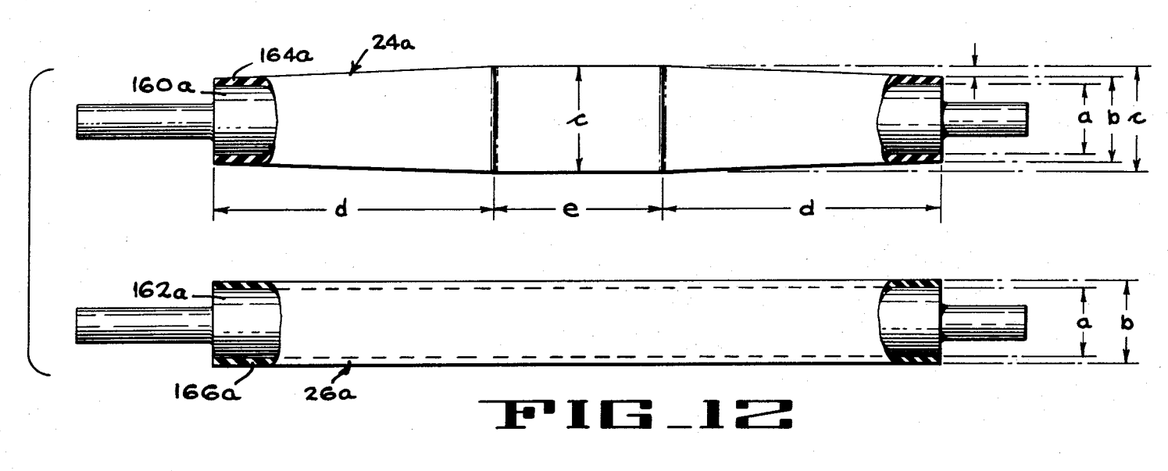
FIG. 12 is a modified form of the invention wherein only one roll of the roll set is tapered.

FIG. 12 illustrates a modified form of an invention wherein all the taper is in one of the rolls (the upper roll 24a in the disclosed embodiment) and the other roll (the lower roll 26a) is cylindrical. In this form, the steel cores 160a,162a of the rolls 24a and 26a are of the same uniform 2.75-inch diameter as in the previous form of the invention. However, the rubber cover 164a of the upper roll 24a now has a major diameter "$c$" of 3.688 inches and a taper of 0.036 inches/ft. instead of 0.018 inches as has been previously described. The end diameter "$b$" is 3.5 inches as before. In this form, although the steel cores of both rolls deflect in service as before, adequate gripping action along the entire length of the rolls, when heavy loaded along their length by the vines, is maintained and no slipping and plugging at the midportion of the rolls occur.

Figure 13:
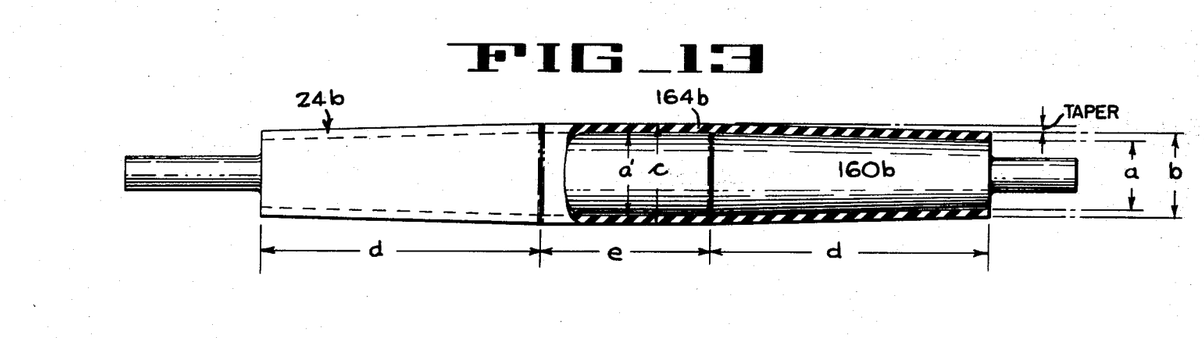
FIG. 13 is a modified form of the invention wherein the taper is in the roll core instead of in its rubber cover.

FIG. 13 shows one of duplicate rolls wherein the taper is in the steel core of the roll instead of in the rubber cover thereof. In this form of the invention (the upper roll 24b being illustrated) the steel core 160b has an end diameter "$a$" of 2.75 inches as before, but has a major diameter "$a$" at the center portion "$e$" thereof of 2.844 inches. A rubber cover 164b has a uniform thickness of three-eighths of an inch and is formed so that the major diameter "$c$" of the roll is 3.594 inches which is the same diameter as that of the preferred form of the invention shown in FIG. 11. A roll set made up of rollers such as roller 24b shown in FIG. 13 will have substantially the same mode of operation as the preferred construction previously described. However, this roll set is not as simple to manufacture in some respects in that it requires machining the steel core 160b instead of merely buffing off the rubber cover for that core, as in the form of FIG. 11.

Figure 14:
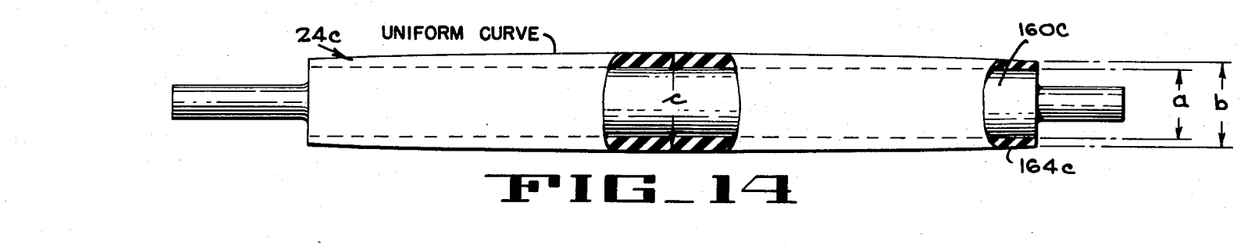
FIG. 14 is a modified form of the invention wherein the roll cover is curved instead of being conically tapered.

FIG. 14 shows another embodiment wherein the roll contour is a *uniform curve*, corresponding to the theoretical deflection curve of a 2.75 inch steel of roll shown in FIG. 10. In this embodiment, wherein only the upper roll 24c is shown, the steel core 160c has a uniform diameter "$a$" of 2.75 inches as before. The surface of the rubber cover 164c is uniformly curved somewhat parabolically to follow the theoretical roll deflection curve of FIG. 10. This roll cover has a minor diameter "$b$" at the ends of the cover of 3.50 inches and a major diameter "$c$" at the midplane of the roll "$c$" of 3.618 inches. With a roll set of this construction the unit pressure at the midportion of the roller is somewhat higher than that of the preferred construction, and although the mode of operation of the roll set is like that previously described the advantages of following a theoretical curve are not deemed to be sufficient to warrant the more complex grinding or contouring operation required to produce the uniform curve of this embodiment.

Figure 15:
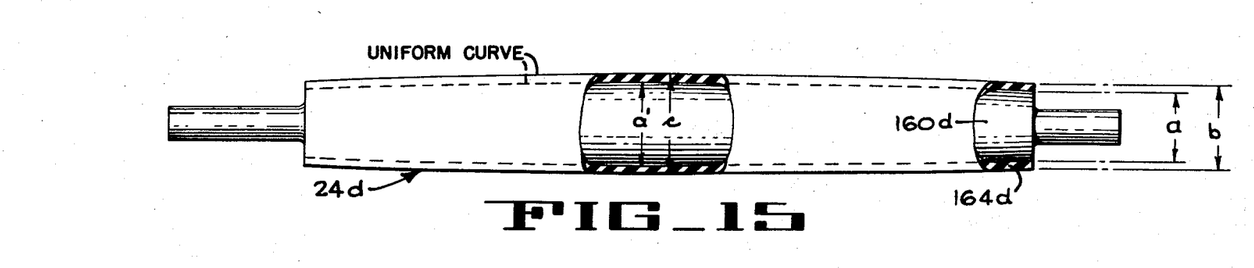
FIG. 15 is another modified form wherein the curve is in the roll core instead of in the rubber cover.

In FIG. 15 an upper snapping roll 24d is shown which operates on the same principal as that of the uniform curve roll 24c. However, in this roll, the steel core 160d is uniformly curved in accordance with the theoretical deflection curve of FIG. 10 from an end diameter "$a$" of 2.75 inches to a midplane diameter "$a'$" of 2.868 inches. The major diameter "$c$" of the rubber cover 164d in this form of the invention is the same as that in the form of FIG. 14, namely 3.618 inches. A roll set constructed in accordance with the design of FIG. 15 will have substantially the same mode of operation as that of the previous forms of the invention.

For ease of illustration and in accordance with the usual engineering principles of the roller dimensions illustrated and described have been given as roll and rubber cover diameters. Actually, however, it is apparent that the deflection action is a *radial* deflection, and that the correction for that deflection represents a corresponding increase in the radius of the roll so that the increase in the diameter of the roll is twice that required to compensate for the deflection of an individual roll in service. For this reason, in the attendant claims the increase in the diameter of the rolls is referred to as a radius increase because this increase corresponds to the action of the rolls for which compensation is provided under the present invention.

Although the best mode contemplated for carrying out the present invention has been herein shown and described, it will be apparent that modification and variation may be made without departing from what is regarded to be the subject matter of the invention.

I claim:

1. In a vine crop harvester comprising a pair of rotating snapping rolls having metal cores covered with rubber, means for feeding vines and attached crop to said rolls, and means at the ends of the rolls for holding the rotating rolls against the vines, said rolls pulling the vines through while snapping the crop from the vines, the radius of at least one roll gradually increasing from a minimum radius at each roll end toward the roll midportion; the improvement wherein the roll midportion is substantially cylindrical and of length equal to about one-third the total roll length, with the magnitude of the total radius increase substantially equaling the total roll core deflection of both rolls that would be engendered by uniformly loading the roll cores along their length under the loading imparted by the vines during harvesting.

2. The harvester of claim 1, wherein the rolls have a diameter of about 3½ inches and a length of over 6 feet.

3. The harvester of claim 1, wherein the radius of each roll is increased by a magnitude substantially equaling the roll core deflection of that roll.

4. The harvester of claim 1, wherein the roll radius increase is provided in the rubber cover and the metal core is of substantial uniform diameter.

5. The harvester of claim 1, wherein the roll feeding means has means for spreading the vines and attached crop into a layer across the length of the snapping rolls.

6. The harvester of claim 3, wherein the roll cores are cylindrical and the radius increase is provided by tapering the roll covers.

7. The harvester of claim 6, wherein said rolls are about 7 feet long and 3½ inches in diameter and wherein the roll cores are about 2¾ inches in diameter.

8. The harvester of claim 6, wherein the rubber roll covers have a durometer of about 45—55 on the Shore scale A.

9. The harvester of claim 8, wherein the radius increase is about 0.018 inches per foot of roll length.